United States Patent
Hurd et al.

(10) Patent No.: US 11,943,025 B2
(45) Date of Patent: Mar. 26, 2024

(54) CONTROL OF TRANSMISSION FROM AN ANTENNA PANEL

(71) Applicant: Telefonaktiebolaget LM Ericsson (PUBL), Stockholm (SE)

(72) Inventors: Magnus Hurd, Stockholm (SE); Zhiming Yin, Danderyd (SE); Jonas Karlsson, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/782,269

(22) PCT Filed: Dec. 17, 2019

(86) PCT No.: PCT/EP2019/085805
§ 371 (c)(1),
(2) Date: Jun. 3, 2022

(87) PCT Pub. No.: WO2021/121567
PCT Pub. Date: Jun. 24, 2021

(65) Prior Publication Data
US 2023/0010357 A1    Jan. 12, 2023

(51) Int. Cl.
*H04B 7/06* (2006.01)
*H04B 7/0413* (2017.01)

(52) U.S. Cl.
CPC ......... *H04B 7/0617* (2013.01); *H04B 7/0413* (2013.01); *H04B 7/0626* (2013.01)

(58) Field of Classification Search
CPC ... H04B 7/0617; H04B 7/0413; H04B 7/0626
(Continued)

(56) References Cited

U.S. PATENT DOCUMENTS

| 2014/0050280 A1* | 2/2014 | Stirling-Gallacher ...... H04B 7/0665 375/296 |
| 2014/0242914 A1* | 8/2014 | Monroe ................ H04B 17/21 455/63.4 |

(Continued)

FOREIGN PATENT DOCUMENTS

| WO | 2018 127426 A1 | 7/2018 |
| WO | 2019 029515 A1 | 2/2019 |

OTHER PUBLICATIONS

PCT Notification of Transmittal of the International Search Report and the Written Opinion of the International Searching Authority, or the Declaration issued for International application No. PCT/EP2019/085805—Sep. 11, 2020.

*Primary Examiner* — Leila Malek
(74) *Attorney, Agent, or Firm* — BAKER BOTTS L.L.P.

(57) ABSTRACT

There is provided mechanisms for controlling transmission from an antenna panel. The method is performed by a network apparatus. A method comprises performing time-domain beamformed communication with terminal devices served by the network apparatus using the antenna panel split into N>1 subpanels. Each subpanel has two input ports and is fed, via the input ports, by signals and configured to generate beams by application of antenna element weights to its antenna elements. The subpanels are at least phase-wise synchronized with each other. When one and the same signal is fed into the input ports of all the subpanels, signals as transmitted from the subpanels add up coherently to represent a 1-layer transmission by a time reference being shared between the subpanels. The time-domain beamformed communication is performed by the network apparatus using from 1 to 2N layers per symbol of a transmission time interval according to a mapping between the input ports and the signals as transmitted from the subpanels.

18 Claims, 8 Drawing Sheets

(58) Field of Classification Search
USPC .......................................................... 375/267
See application file for complete search history.

(56) References Cited

U.S. PATENT DOCUMENTS

2016/0315680 A1* 10/2016 Braun .................. H04B 7/0695
2018/0248263 A1    8/2018 Petersson et al.
2020/0329099 A1* 10/2020 Liberti ................. H04L 5/0035

* cited by examiner

CONTROL OF TRANSMISSION FROM AN ANTENNA PANEL

PRIORITY

This nonprovisional application is a U.S. National Stage Filing under 35 U.S.C. § 371 of International Patent Application Ser. No. PCT/EP2019/085805 filed Dec. 17, 2019 and entitled "CONTROL OF TRANSMISSION FROM AN ANTENNA PANEL" which is hereby incorporated by reference in its entirety.

TECHNICAL FIELD

Embodiments presented herein relate to a method, a network apparatus, a computer program, and a computer program product for controlling transmission from an antenna panel.

BACKGROUND

In communications networks, there may be a challenge to obtain good performance and capacity for a given communications protocol, its parameters and the physical environment in which the communications network is deployed. For example, one parameter in providing good performance and capacity for a given communications protocol in a communications network is beamforming.

Time-domain beamforming such as analog beamforming means one beamform applies to all frequency resources part of a transmission. Typically, a set of predefined beamforms, such as a so-called Grid of Beams (GOB), is designed to cover a certain spatial region in which network access thus is provided. Based on feedback (either formulated as a report indicating a preferred beamform or simply based on a physical measurement of received power per predefined beamform) from served terminal devices, such as user equipment (UE), the base station would subsequently transmit on one of these beamforms accordingly to communicate a message to the terminal device. This implies that only terminal devices being associated to a beamform currently selected by the base station can be served at one point in time, whereas any other terminal devices need to wait until the base station selects a beamform of their preference. This beamforming constraint is the essence of time-domain beamforming.

If which beamform to select for the terminal device is based on the terminal device reporting channel state information (CSI) the base station would issue transmissions of one-port CSI Reference Signals (CSI-RS). Every such CSI-RS transmission is subject to one of the beamforms of the GOB. The terminal device then measures the received power (such as reference signal received power; RSRP) on each CSI-RS and reports this back to the base station accordingly. Typically, only a subset of the beams that are believed to be relevant for the terminal device are being tested.

The terminal device is then to measure on an N-port CSI-RS with the intention to report back to the base station recommended Rank Indication (RI), Precoding Matrix Indicator (PMI) and Channel Quality Indicator (CQI). This CSI-RS is beamformed according to one of the previously reported beamforms. For time-domain beamforming, N=2, assuming a GOB with narrow beams and using both of two polarizations.

The base station is equipped with one or more antenna panels for radio communication with its served terminal devices. Each antenna panel represents an array of antenna elements. FIGS. 1 and 2 illustrate communication between a transmission and reception point (TRP) 140 and a terminal device 150. As shown in FIG. 1, one antenna panel 142 comprising individual antenna elements 144 is serving a terminal device 150 using a beam 16o for transmission of two data streams $s_0$ and $s_1$. The terminal device 150 is served in a range of a contiguous frequency spectrum. FIG. 2 illustrates an example where the antenna panel 142 is divided into subpanels 142a, 142b for transmission using two beams 160a, 160b of four data streams $s_0$, $s_1$, $s_2$ and $s_3$. This could be the case where the spectrum is split into two or more frequency chunks. Each subpanel 142a, 142b thus serves one of the spectrum chunks. In this case the power is shared over the subpanels, implying that there is a 3 dB reduction for the power allocated to a subpanel each time the antenna panel is split. Also the beamforming gain is lowered another 3 dB since fewer antenna elements serve each spectrum chunk. Altogether this accounts for a reduction in the received power at the terminal device of 6 dB for each level of split.

For the examples above, at most two-layer transmissions are to be expected. Splitting an antenna panel into subpanels to serve frequency resources independent from each other loses the potential beamforming gain of the full antenna panel. This reduces coverage.

For data transmissions based on rather narrow beams in the GOB, it is unlikely that more than two transmission layers can be supported, beyond what is supported by the polarization degrees of freedom.

Hence, there is still a need for an improved time-domain beamformed communication.

SUMMARY

An object of embodiments herein is to provide efficient time-domain beamformed communication not suffering from the issues noted above, or at least where the above noted issues are mitigated or reduced.

According to a first aspect there is presented a method for controlling transmission from an antenna panel. The method is performed by a network apparatus. The method comprises performing time-domain beamformed communication with terminal devices served by the network apparatus using the antenna panel split into N>1 subpanels. Each subpanel has two input ports and is fed, via the input ports, by signals and configured to generate beams by application of antenna element weights to its antenna elements. The subpanels are at least phase-wise synchronized with each other. When one and the same signal is fed into the input ports of all the subpanels, signals as transmitted from the subpanels add up coherently to represent a 1-layer transmission by a time reference being shared between the subpanels. The time-domain beamformed communication is performed by the network apparatus using from 1 to 2N layers per symbol of a transmission time interval according to a mapping between the input ports and the signals as transmitted from the subpanels.

According to a second aspect there is presented a network apparatus for controlling transmission from an antenna panel. The network apparatus comprises processing circuitry. The processing circuitry is configured to cause the network apparatus to perform time-domain beamformed communication with terminal devices served by the network apparatus using the antenna panel split into N>1 subpanels. Each subpanel has two input ports and is fed, via the input ports, by signals and configured to generate beams by application of antenna element weights to its antenna elements. The subpanels are at least phase-wise synchronized with each other. When one and the same signal is fed into the input ports of all the subpanels, signals as transmitted from the subpanels add up coherently to represent a 1-layer transmission by a time reference being shared between the subpanels. The time-domain beamformed communication is performed by the network apparatus using from 1 to 2N layers per symbol of a transmission time interval according to a mapping between the input ports and the signals as transmitted from the subpanels.

According to a third aspect there is presented a network apparatus for controlling transmission from an antenna panel. The network apparatus comprises a communication module (210a) configured to perform time-domain beamformed communication with terminal devices served by the network apparatus using the antenna panel split into N>1 subpanels. Each subpanel has two input ports and is fed, via the input ports, by signals and configured to generate beams by application of antenna element weights to its antenna elements. The subpanels are at least phase-wise synchronized with each other. When one and the same signal is fed into the input ports of all the subpanels, signals as transmitted from the subpanels add up coherently to represent a 1-layer transmission by a time reference being shared between the subpanels. The time-domain beamformed communication is performed by the network apparatus using from 1 to 2N layers per symbol of a transmission time interval according to a mapping between the input ports and the signals as transmitted from the subpanels.

According to a fourth aspect there is presented a computer program for controlling transmission from an antenna panel, the computer program comprising computer program code which, when run on a network apparatus, causes the network apparatus to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient time-domain beamformed communication.

Advantageously, the provided time-domain beamformed communication does not suffer from the issues noted above.

Advantageously, these aspects enable multi-layer single user multiple input multiple output (SU-MIMO) communication using time-domain beamforming whilst still maintaining the beamforming gain and the power budget for both single-layer and two-layer transmissions in the same deployment.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 3:
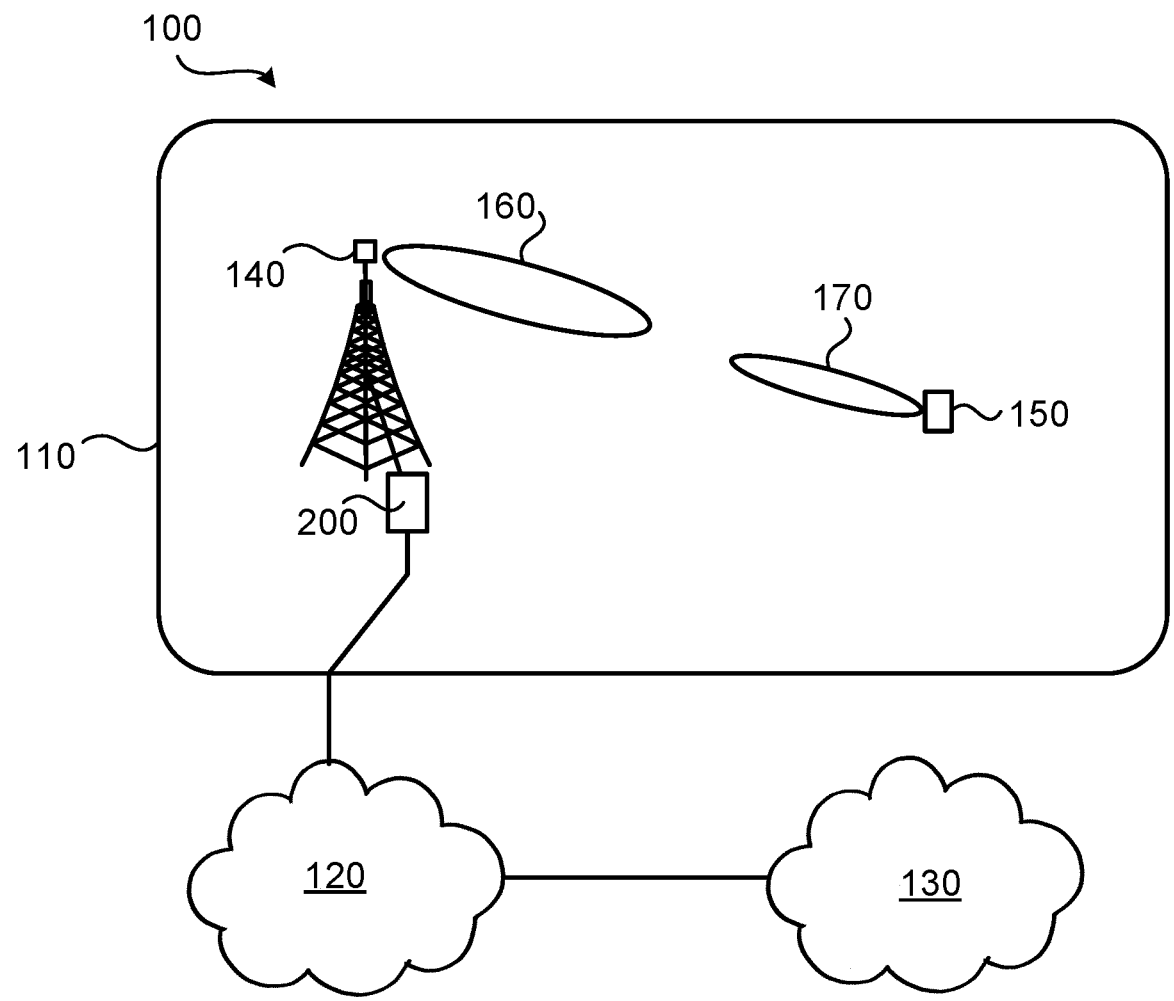
FIG. 3 is a schematic diagram illustrating a communication network according to embodiments.

FIG. 3 is a schematic diagram illustrating a communication network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a network apparatus 200 configured to provide network access to at least one terminal device 150 in a radio access network 110. The radio access network 110 is operatively connected to a core network 120. The core network 120 is in turn operatively connected to a service network 130, such as the Internet. The terminal device 150 is thereby enabled to, via the network apparatus 200, access services of, and exchange data with, the service network 130.

Figure 1:
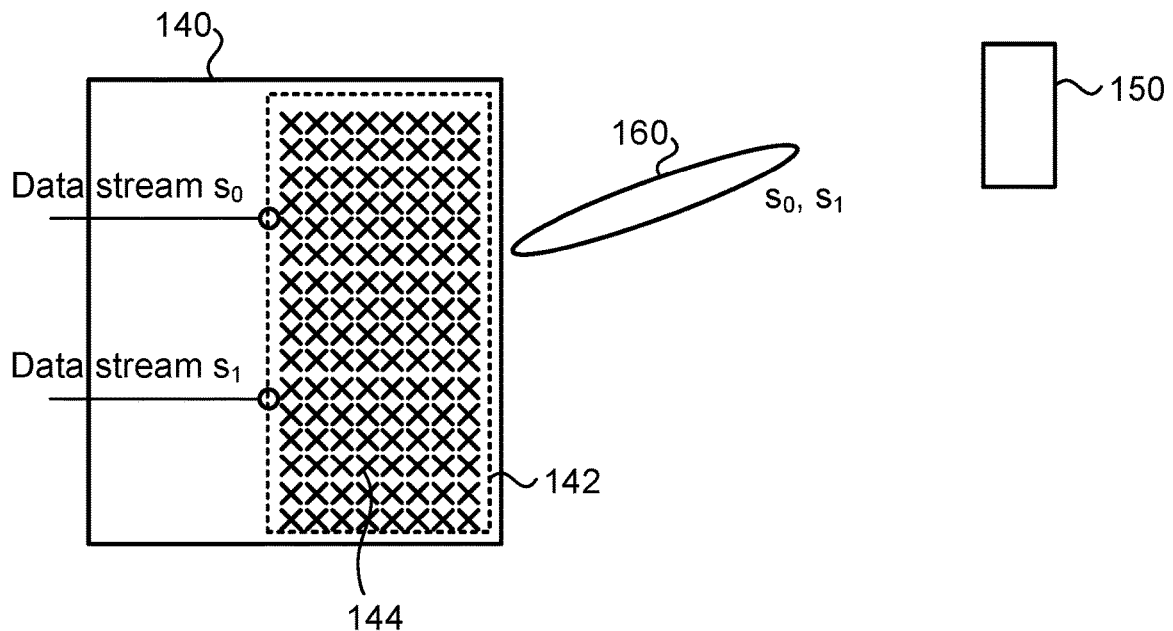
FIGS. 1 and 2 schematically illustrate TRPs configured for beamformed communication with a terminal device.
Figure 2:
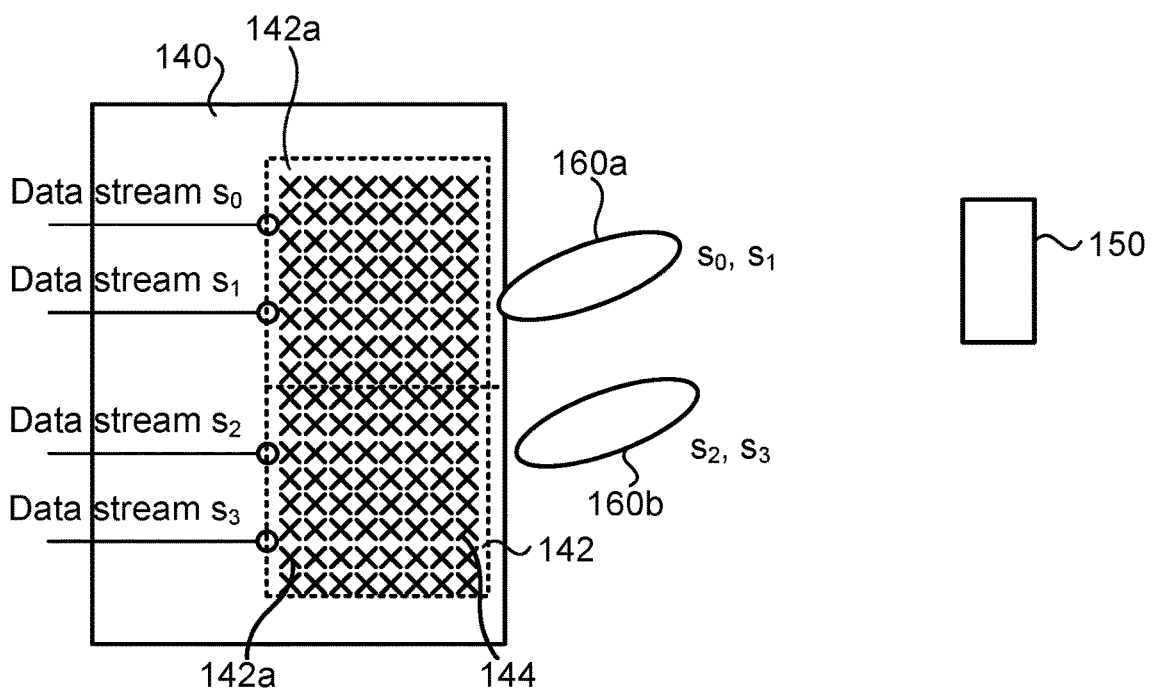

The network apparatus 200 comprises, is collocated with, is integrated with, or is in operational communications with, a TRP 140. The network apparatus 200 (via its TRP 140) and the terminal device 150 are configured to communicate with each other in beams. In the illustrative example of FIG. 1, beam 160 is the beam currently being used by the TRP 140142 for communication with the terminal device 150, and beam 170 is the beam currently being used by the terminal device 150 for communication with the antenna panel 142. The TRP 140 comprises an antenna panel (not shown in FIG. 3) that is divided into subpanels. In some examples, per symbol of a transmission time interval, each subpanel is configured to generate either exactly one doublepolarized beam or exactly two beams having orthogonal polarization with respect to each other.

Examples of network apparatuses 200 are radio base stations, base transceiver stations, Node Bs, evolved Node Bs, gNBs, access points, access nodes, and backhaul nodes. Examples of terminal devices 150 are wireless devices, mobile stations, mobile phones, handsets, wireless local loop phones, user equipment (UE), smartphones, laptop computers, tablet computers, network equipped sensors, network equipped vehicles, and so-called Internet of Things devices.

As noted above there is a need for improved time-domain beamformed communication.

In more detail, different subpanels 142a, 142b covering the same frequency spectrum would not enable improved beamforming gain since data streams from different subpanels do not add up coherently (due to lack of synchronization between the subpanels 142a, 142b).

The embodiments disclosed herein therefore relate to mechanisms for controlling transmission from an antenna panel 142. In order to obtain such mechanisms, there is provided a network apparatus 200, a method performed by the network apparatus 200, a computer program product comprising code, for example in the form of a computer program, that when run on a network apparatus 200, causes the network apparatus 200 to perform the method.

Figure 4:
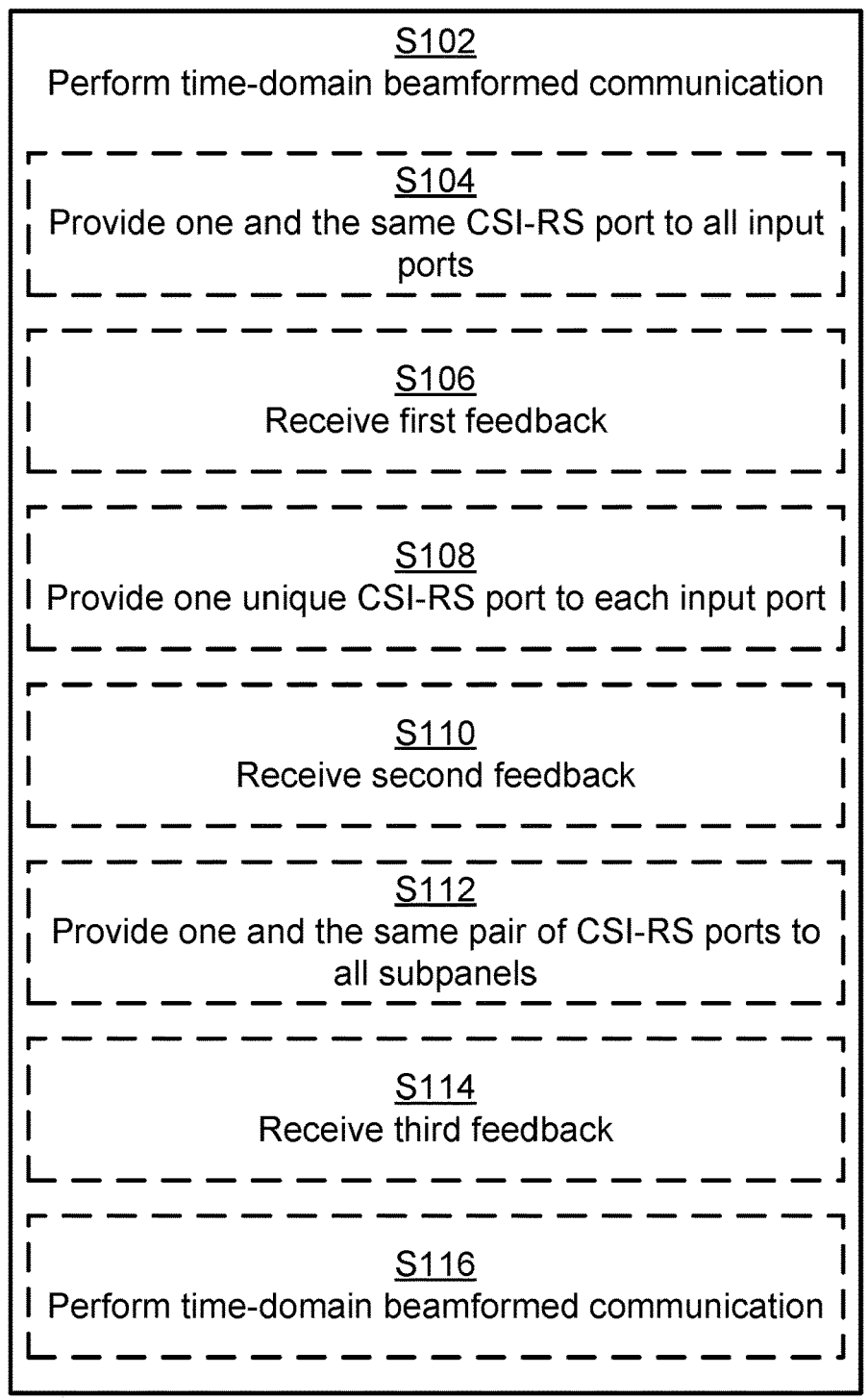
FIG. 4 is a flowchart of methods according to embodiments.

FIG. 4 is a flowchart illustrating embodiments of methods for controlling transmission from an antenna panel 142. The methods are performed by the network apparatus 200. The methods are advantageously provided as computer programs 1020.

S102: The network apparatus 200 performs time-domain beamformed communication with terminal devices 150 served by the network apparatus 200 using the antenna panel 142 split into N>1 subpanels 142a, 142b. Each subpanel 142a, 142b has its own two input ports. Each subpanel 142a, 142b is fed by its own signals via the input ports. Each subpanel 142a, 142b is configured to generate beams by application of antenna element weights to its antenna elements 144.

The subpanels 142a, 142b are at least phase-wise synchronized with each other. When one and the same signal is fed into the input ports of all the subpanels 142a, 142b, signals as transmitted from the subpanels 142a, 142b add up coherently to represent a 1-layer transmission by a time reference being shared between the subpanels 142a, 142b.

The time-domain beamformed communication is performed by the network apparatus 200 using from 1 to 2N layers per symbol of a transmission time interval according to a mapping between the input ports and the signals as transmitted from the subpanels 142a, 142b.

The subpanels are synchronized so that that one unique signal fed into the different input ports of all the subpanels result in streams adding up coherently.

Based on the subpanel division (and phase-wise synchronization), multi-port CSI-RS (i.e., more than 2 ports) is enabled to support multi-layer SU-MIMO (i.e., more than 2 transmission layers).

As will be further disclosed below, the same phase-wise synchronized subpanels 142a, 142b might be also used for single-layer transmissions without loss of transmission power or beamforming gain, by feeding the same signal into all ports of all subpanels 142a, 142b. This is useful for common channels (i.e., channels whose content is shared among two or more terminal devices 150) such as the physical broadcast channel (PBCH).

All in all, depending on deployment, the subpanels 142a, 1402b are by the network apparatus 200 configured to co-operate to support e.g. either a split spectrum (typically for two-layer transmissions per frequency chunk) or a contiguous spectrum (typically for transmissions with more than two transmission layers). The number of transmission layers, the power and the frequency range can thereby be traded against each other.

Embodiments relating to further details of time-domain beamforming from an antenna panel 142 as performed by the network apparatus 200 will now be disclosed with continued reference to FIG. 4.

At least some of the below embodiment show how a configuration with two subpanels 142a, 142b can offer transmissions with the number of layers exceeding two, whilst still maintaining the full power budget and beamforming gain for single-layer transmissions. Hence, in some examples, N=2. However, the below embodiments are also applicable for N>2 whilst still offering the same benefits.

Figure 5:
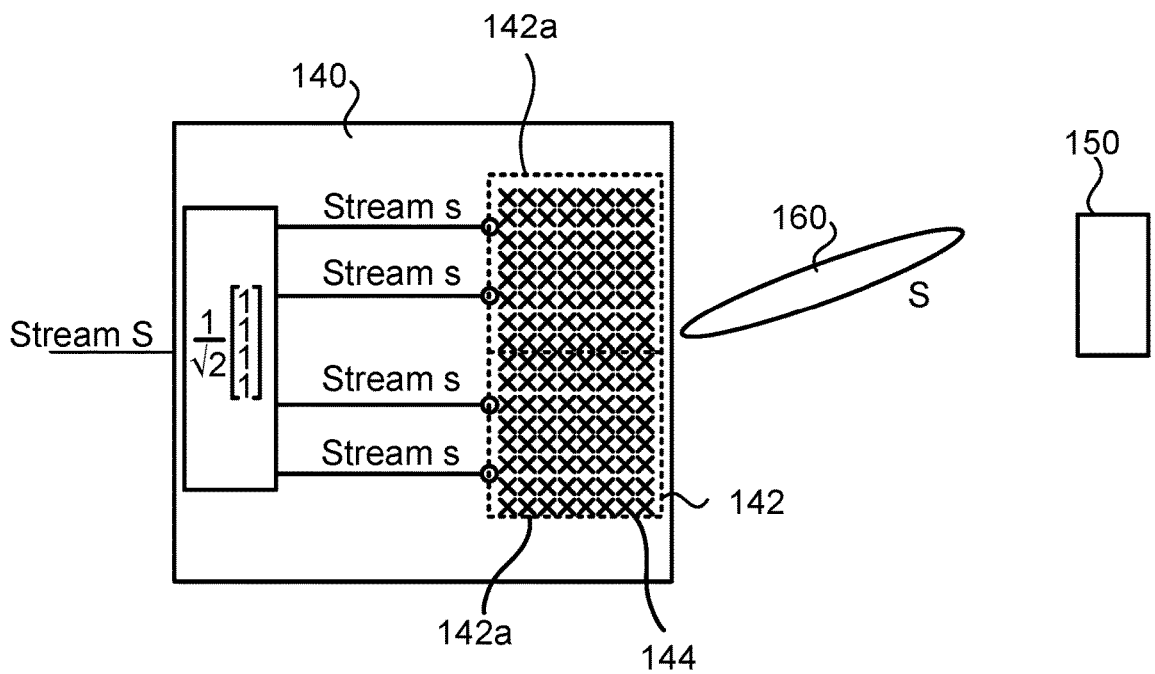
FIGS. 5, 6, 7 schematically illustrate TRPs configured for beamformed communication with a terminal device according to embodiments.

Parallel reference is made to FIG. 5 which schematically illustrates two subpanels 142a, 142b configured for beamformed communication with a terminal device 150 according to an embodiment. In order to provide the full beamforming gain for a one-layer transmission, the antenna weights defined for the one-antenna panel case (shown in FIG. 1). According to an embodiment, the antenna element weights are thus reused between the subpanels 142a, 142b. Thereby, all subpanels 142a, 142b are, according to the antenna element weights, identically weighted. According to another example, the antenna weights of the antennas in the upper half of the antenna panel in FIG. 1 apply to subpanel 142a in FIG. 5, and the antenna weights of the antennas in the lower half of the antenna panel in FIG. 1 apply to subpanel 142b in FIG. 5. Thus, in another embodiment, the antenna weights of the antenna panel as undivided apply also to the antenna panel as divided into the subpanels 142a, 142b. Together they combine to exactly represent the one-layer transmission of FIG. 1.

In more detail, FIG. 5 illustrates an example of one-layer transmissions for a 2-subpanel. The same signal s is injected into all the ports of the subpanels 142a, 142b. The different subpanels 142a, 142b are fully synchronized and thereby enabled to provide the full beamforming gain. Application of any precoder prior to the input ports that provides equal amount of power to the input ports is acceptable. Hence, according to an embodiment, the network apparatus 200 is configured to perform (optional) action S104 as part performing the time-domain beamformed communication in action S104:

S104: The network apparatus 200 provides one and the same antenna port of a one-port CSI-RS port to all input ports. The one-port CSI-RS is then transmitted in a first set of beams.

The two subpanels 142a, 142b allow for more beams, one per polarization and subpanel 142a, 142b. This might be exploited to prepare for multi-layer SU-MIMO with up to 2N transmission layers. The subpanels 142a, 142b also allow for receiving up to 2N layers from the terminal device 150 (as for reception of a 2N-layer physical uplink shared channel (PUSCH) instance from the terminal device 150). Generally, the more subpanels 142a, 142b are used, the more layers can be supported (N per subpanel).

In some aspects the terminal device 150 reports back measurements of the strongest beams in the first set of beams, based on one-port CSI-RS resources. The port of the CSI-RS could be implemented using the same precoder as for the one-layer transmission. Hence, according to an embodiment, the network apparatus 200 is configured to perform (optional) action S106 as part performing the time-domain beamformed communication in action S102:

S106: The network apparatus 200 receives, from one of the terminal devices served by the network apparatus 200, first feedback. The first feedback at least identifies which beam in the first set of beams was received with highest power by the terminal device.

This first feedback might be classified as a 'cri-RSRP' measurement in the technical specification 3GPP TS 38.214 entitled "NR; Physical layer procedures for data", version 15.7.0 or in the technical specification 3GPP TS 38.331 entitled "NR; Radio Resource Control (RRC); Protocol specification", version 15.7.0 and reported as Uplink Control Information (UCI) as described in the technical specification 3GPP TS 38.212 entitled "NR; Multiplexing and channel coding", version 15.7.0. By means of radio resource control (RRC) configuration the number of (strongest) beams reported can be configured using the parameter nrofReportedRS (ranging from 1 to 4). Formally the UCI would then contain each of the (strongest) beams (in terms of RSRP); the strongest beam is presented with its CSI-RS Resource Indicator (CRI) and its associated RSRP and the next strongest beams are presented with their respective CRI and their respective differential RSRP (i.e., the difference to the RSRP of the strongest beam).

Figure 6:
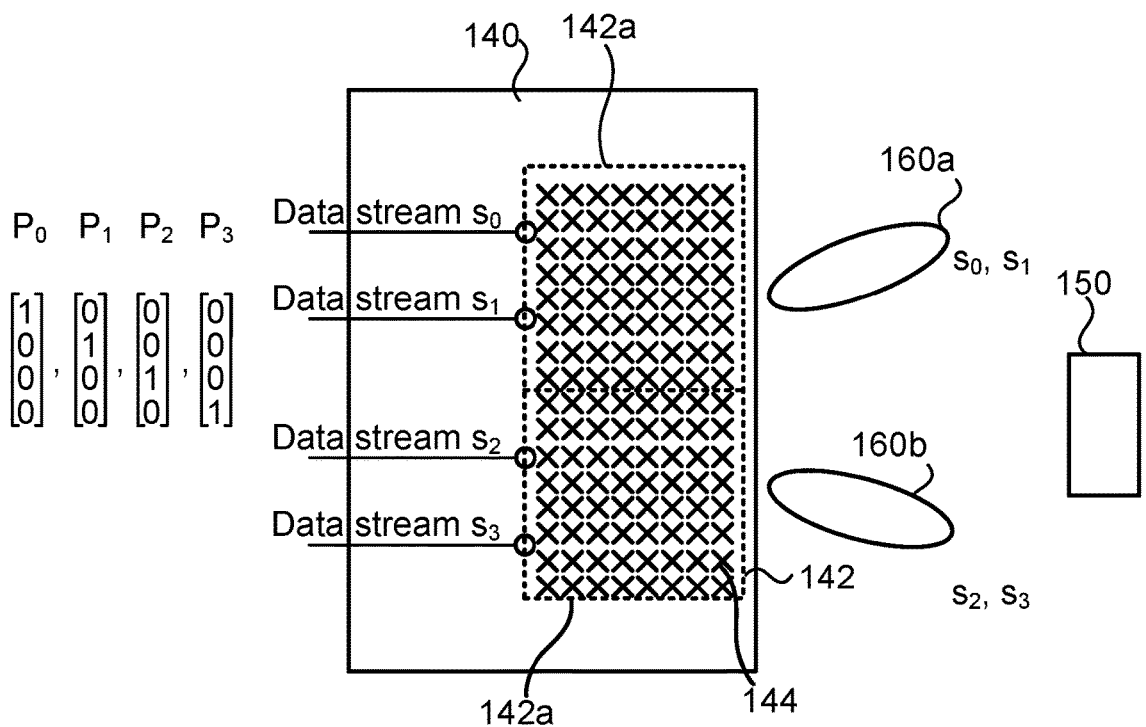

Parallel reference is made to FIG. 6 which schematically illustrates two subpanels 142a, 142b configured for beamformed communication with a terminal device 150 according to an embodiment. In more detail, FIG. 6 illustrates an example of a 2N-port CSI-RS, where N=2. A beamformed 2N-port CSI-RS might be transmitted upon the network apparatus 200 receiving the first feedback from the terminal device 150 in S106 but might also be transmitted in other scenarios. Hence, according to an embodiment, the network apparatus 200 is configured to perform (optional) action S108 as part performing the time-domain beamformed communication in action S102:

S108: The network apparatus 200 provides one unique antenna port of a 2N-port CSI-RS to each of the input ports. The 2N-port CSI-RS are then transmitted in a second set of beams selected according to the first feedback.

FIG. 6 shows how the different CSI-RS ports $P_i$ map to the different input streams $s_i$ of the subpanels 142a, 142b. The ports $P_0$ and $P_1$ are transmitted on beam 160a, whereas the ports $P_2$ and $P_3$ are transmitted on beam 160b.

This allows the terminal device 150 to report channel information for this combined beamform. Hence, according to an embodiment, the network apparatus 200 is configured to perform (optional) action S110 as part performing the time-domain beamformed communication in action S102:

S110: The network apparatus 200 receives, from this one of the terminal devices 150, second feedback. The second feedback comprises channel information, such as RI, PMI and/or CQI, relating to the second set of beams. The channel information at least indicates how many transmission layers to be used for communication with this one of the terminal devices 150.

Since the inclusion of several beams in the second set of beams opens up for more spatial layers the terminal device 150 may report an RI exceeding 2. Upcoming transmissions of physical downlink shared channel (PDSCH) instances might then be on more than 2 layers according to the channel information, see S116 below. It might be assumed that the PDSCH transmissions are all subject to the same port-to-antenna mapping as used for CSI-RS before application of that precoder that is indicated by the PMI.

Figure 7:
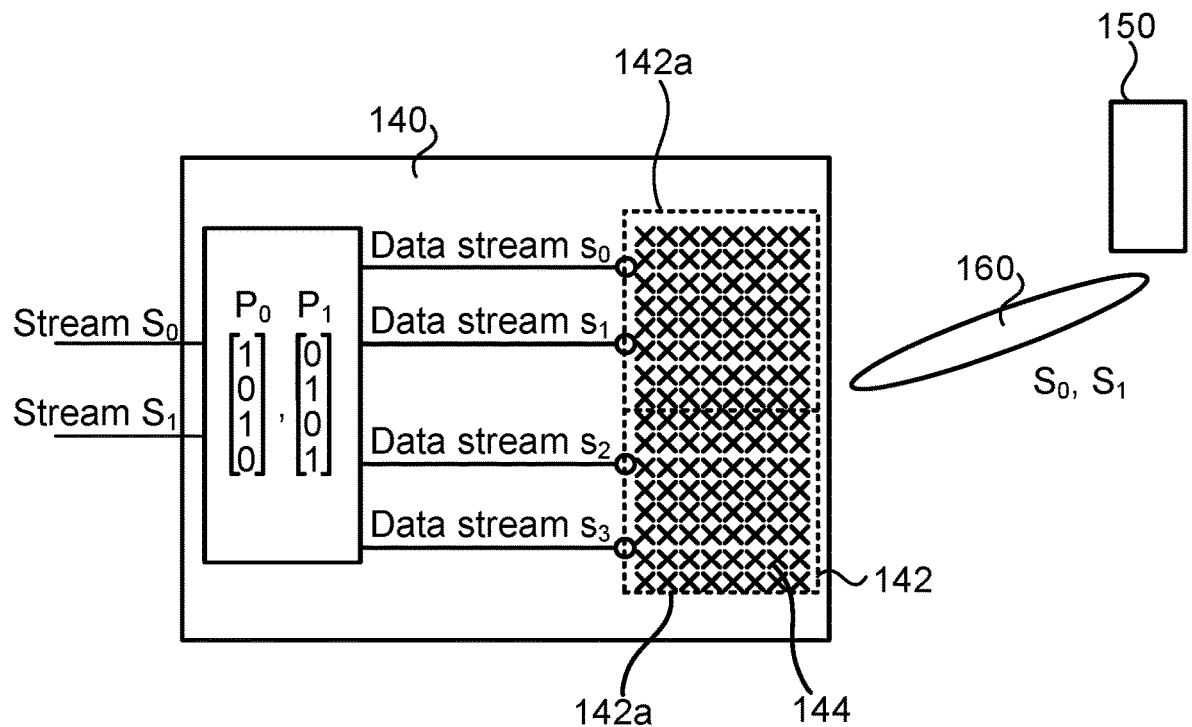

Parallel reference is made to FIG. 7 which schematically illustrates two subpanels 142a, 142b configured for beamformed communication with a terminal device 150 according to an embodiment. In more detail, FIG. 7 illustrates an example of an N-port CSI-RS where N=2. Hence, according to an embodiment, the network apparatus 200 is configured to perform (optional) action S112 as part performing the time-domain beamformed communication in action S102:

S112: The network apparatus 200 provides an M-port CSI-RS, where M≤N, and where each antenna port is associated with N subpanels 142a, 142b. One input port only from each subpanel 142a, 142b is assigned to the antenna ports. The M-port CSI-RS is then transmitted in a third set of beams selected according to the first or second feedback. In some examples, M=2.

Such an M-port CSI-RS might be transmitted in parallel to the 2N-port CSI-RS transmissions (but on other time occasions). As a non-limiting example, if the reported CSI feedback for the 2N-port CSI-RS indicates that transmission is not spectrally efficient, fallback can be made to PDSCH transmissions based on CSI feedback from the M-port CSI-RS. As for the above embodiments, for the one-layer transmission it is possible to reuse the antenna weights defined for an M-port CSI-RS in a setup where half the number of subpanels is used. According to the illustrative example of FIG. 7, port $P_0$ is mapped to inputs $s_0$ and $s_2$, where $s_0$ is subject to antenna weights re-used from the upper half of the one-antenna panel case, and where $s_2$ is subject to antenna weights re-used from the lower half of the one-antenna panel case. A similar mapping applies to $P_1$ with regards to $s_1$ and $s_3$.

This allows the terminal device 150 to report channel information for this c third set of beams. According to an embodiment, the network apparatus 200 is configured to perform (optional) action S114 as part performing the time-domain beamformed communication in action S102:

S114: The network apparatus 200 receives, from this one of the terminal devices 150, third feedback. The third feedback comprises channel information, such as RI, PMI and/or CQI, relating to the third set of beams. The channel information at least indicating how many transmission layers to be used for communication with this one of the terminal devices 150.

Note that there is no normalization in FIG. 7. The normalization can be viewed as implemented from the splitting of the antenna panel 142 into subpanels 142a, 142b since one data stream is only allocated to one subpanel. The normalization (of the square root of two) in FIG. 5 can be understood as from a two-step reasoning: firstly there are two ports as shown in FIG. 7 (with no normalization); secondly the one layer is mapped onto the two ports with the typical normalization of the square root of two. The two-subpanel configuration handles a one-layer transmission the same way as a one-antenna panel configuration.

Communication with the terminal device 150 might then be performed based on either the feedback to the 2N-port CSI-RS or the feedback to the M-port CSI-RS. Hence, according to an embodiment, the network apparatus 200 is configured to perform (optional) action S116 as part performing the time-domain beamformed communication in action S102:

S116: The network apparatus 200 performs S116 time-domain beamformed communication with said one of the terminal devices 150 according to the channel information. The beamformed communication is then performed using as many transmission layers as indicated by the channel information.

Figure 8:
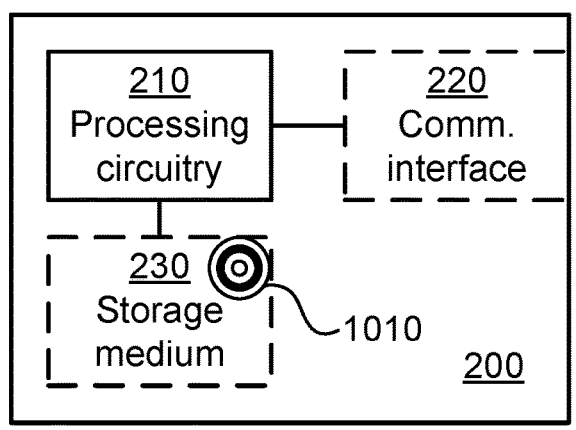
FIG. 8 is a schematic diagram showing functional units of a network apparatus according to an embodiment.

FIG. 8 schematically illustrates, in terms of a number of functional units, the components of a network apparatus 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network apparatus 200 to perform a set of operations, or actions, as disclosed above. For example, the storage medium 230 may store the set of operations, and the processing circuitry 210 may be configured to retrieve the set of operations from the storage medium 230 to cause the network apparatus 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network apparatus 200 may further comprise a communications interface 220 at least configured for communications with other entities, functions, nodes, devices, and apparatuses of the communication network 100. As such the communications interface 220 may comprise one or more transmitters and receivers, comprising analogue and digital components. The processing circuitry 210 controls the general operation of the network apparatus 200 e.g. by sending data and control signals to the communications interface 220 and the storage medium 230, by receiving data and reports from the communications interface 220, and by retrieving data and instructions from the storage medium 230. Other components, as well as the related functionality, of the network apparatus 200 are omitted in order not to obscure the concepts presented herein.

Figure 9:
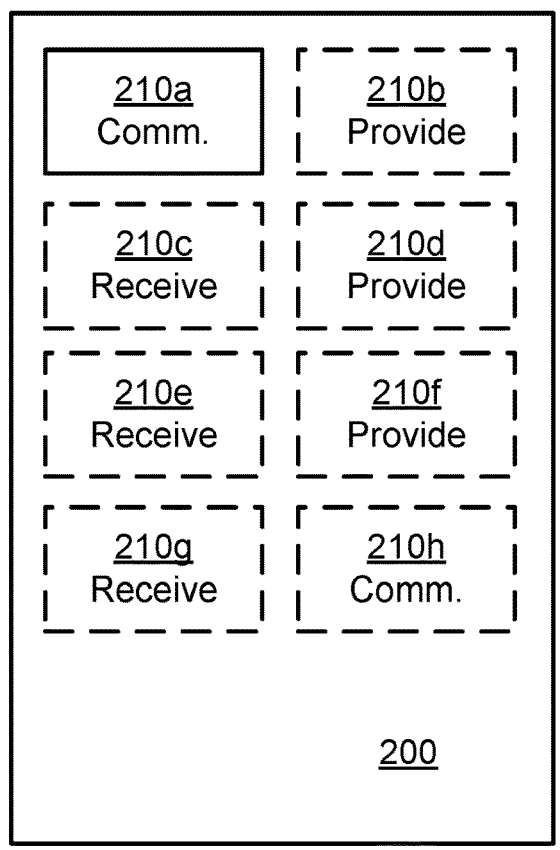
FIG. 9 is a schematic diagram showing functional modules of a network apparatus according to an embodiment.

FIG. 9 schematically illustrates, in terms of a number of functional modules, the components of a network apparatus 200 according to an embodiment. The network apparatus 200 of FIG. 9 comprises a communication module 210a configured to perform action S102. The network apparatus 200 of FIG. 9 may further comprise a number of optional functional modules, such as any of a provide module 210b configured to perform action S104, a receive module 210c configured to perform action S106, a provide module 210d configured to perform action S108, a receive module 210e configured to perform action S110, a provide module 210f configured to perform action S112, a receive module 210g configured to perform action S114, and a communication module 210h configured to perform action S116.

In general terms, each functional module 210a-210h may in one embodiment be implemented only in hardware and in another embodiment with the help of software, i.e., the latter embodiment having computer program instructions stored on the storage medium 230 which when run on the processing circuitry makes the network apparatus 200 perform the corresponding actions mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any actions as disclosed herein.

The network apparatus 200 may be provided as a stand-alone device or as a part of at least one further device. For example, the network apparatus 200 may be provided in a node of the radio access network or in a node of the core network. Alternatively, functionality of the network apparatus 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network apparatus 200 may be executed in a first device, and a second portion of the of the instructions performed by the network apparatus 200 may be executed in a second device; the herein disclosed embodiments are not limited to any particular number of devices on which the instructions performed by the network apparatus 200 may be executed. Hence, the methods according to the herein disclosed embodiments are suitable to be performed by a network apparatus 200 residing in a cloud computational environment. Therefore, although a single processing circuitry 210 is illustrated in FIG. 8 the processing circuitry 210 may be distributed among a plurality of devices, or nodes. The same applies to the functional modules 210a-210h of FIG. 9 and the computer program 1020 of FIG. 10.

Figure 10:
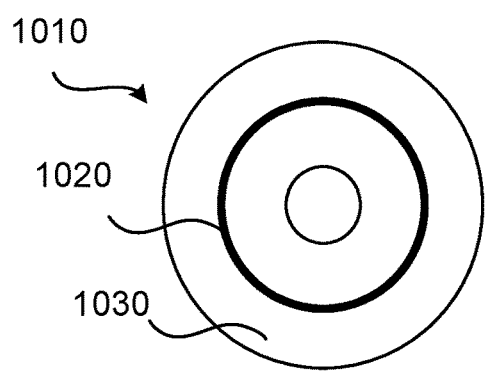
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any actions as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

Figure 11:
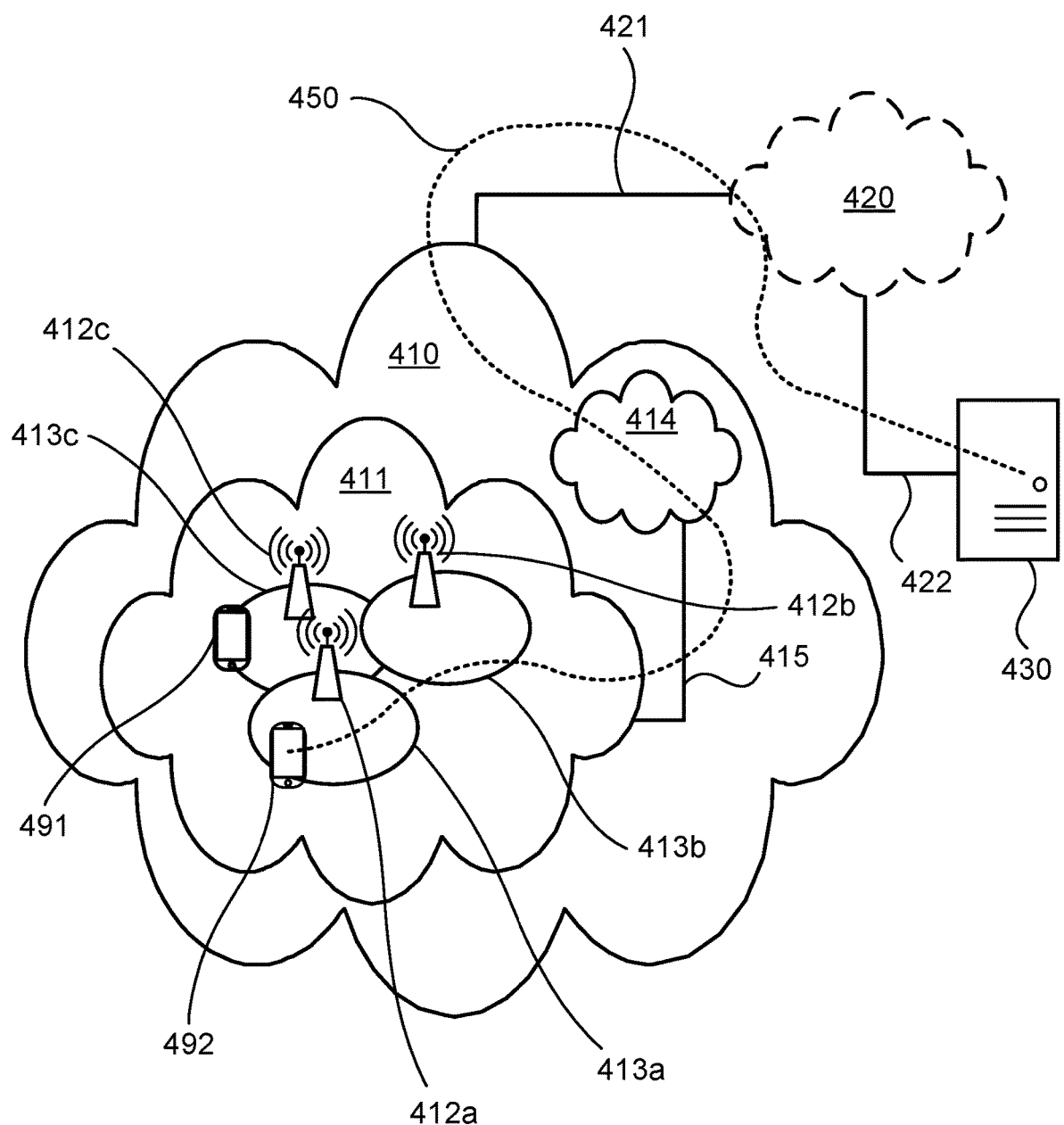
FIG. 11 is a schematic diagram illustrating a telecommunication network connected via an intermediate network to a host computer in accordance with some embodiments.

FIG. 11 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 3, and core network 414, such as core network 120 in FIG. 3. Access network 411 comprises a plurality of radio access network nodes 412a, 412b, 412c, such as NBs, eNBs, gNBs (each corresponding to the network apparatus 200 of FIG. 3) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 150 of FIG. 3.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 12:
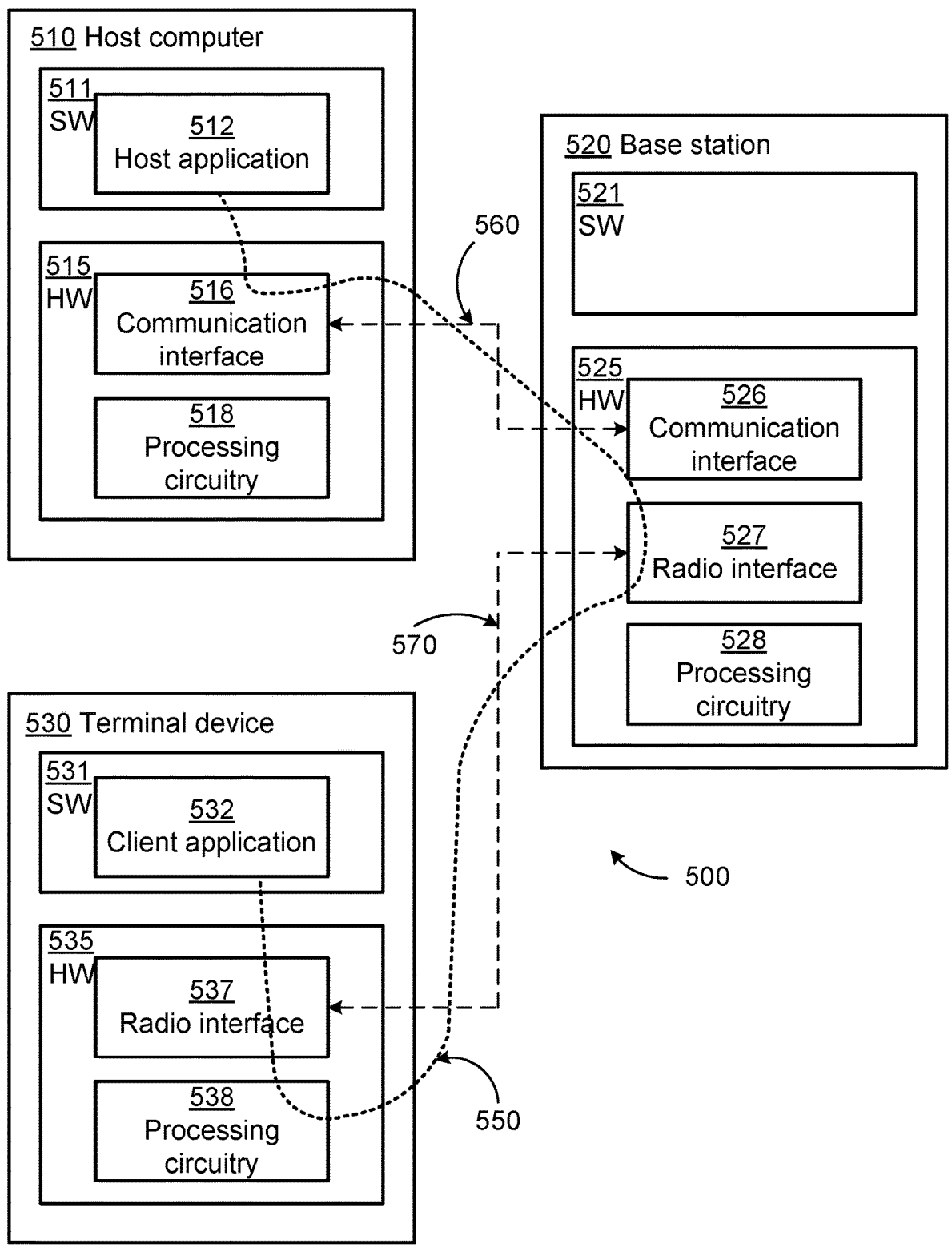
FIG. 12 is a schematic diagram illustrating host computer communicating via a radio base station with a terminal device over a partially wireless connection in accordance with some embodiments.

FIG. 12 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 150 of FIG. 3. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network apparatus 200 of FIG. 3. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by radio access network node 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 12 may be similar or identical to host computer 430, one of network nodes 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling transmission from an antenna panel, the method being performed by a network apparatus, the method comprising:
    performing time-domain beamformed communication with terminal devices served by the network apparatus using the antenna panel split into N>1 subpanels, each subpanel having two input ports and being fed, via the input ports, by signals and configured to generate beams by application of antenna element weights to its antenna elements, wherein the subpanels are at least phase-wise synchronized with each other, wherein when one and the same signal is fed into the input ports of all the subpanels, signals as transmitted from the subpanels add up coherently to represent a 1-layer transmission by a time reference being shared between the subpanels,
    wherein the time-domain beamformed communication is performed by the network apparatus using from 1 to 2N layers per symbol of a transmission time interval according to a mapping between the input ports and the signals as transmitted from the subpanels, and
    wherein performing time-domain beamformed communication comprises providing one and the same antenna port of a one-port CSI-RS port to all input ports, wherein the one-port CSI-RS is transmitted in a first set of beams.

2. The method according to claim 1, wherein the antenna element weights are reused between the subpanels, whereby all subpanels are, according to the antenna element weights, identically weighted.

3. The method according to claim 1, wherein performing time-domain beamformed communication comprises:
    receiving, from one of the terminal devices served by the network apparatus, a first feedback, the first feedback at least identifying which beams in the first set of beams was received with highest power by the terminal device.

4. The method according to claim 3, wherein performing time-domain beamformed communication comprises:
    providing one unique antenna port of a 2N-port CSI-RS to each of the input ports, wherein the 2N-port CSI-RSs are transmitted in a second set of beams selected according to the first feedback.

5. The method according to claim 4, wherein performing time-domain beamformed communication comprises:
    receiving, from said one of the terminal devices, second feedback, the second feedback comprising channel information relating to the second set of beams, the channel information at least indicating how many transmission layers to be used for communication with said one of the terminal devices.

6. The method according to claim 5, wherein performing time-domain beamformed communication comprises:
    providing an M-port CSI-RS, where M≤N, where each antenna port is associated with N subpanels, wherein one input port only from each subpanel is assigned to the antenna port, and wherein the M-port CSI-RS is transmitted in a third set of beams selected according to the first or second feedback.

7. The method according to claim 6, wherein performing time-domain beamformed communication comprises:
    receiving, from said one of the terminal devices, third feedback, the third feedback comprising channel information relating to the third set of beams, the channel information at least indicating how many transmission layers to be used for communication with said one of the terminal devices.

8. The method according to claim 5, wherein performing time-domain beamformed communication comprises:
performing time-domain beamformed communication with said one of the terminal devices according to the channel information, whereby the beamformed communication is performed using as many transmission layers as indicated by the channel information.

9. The method according to claim 1, wherein N=2.

10. A network apparatus for controlling transmission from an antenna panel, the network apparatus comprising processing circuitry, the processing circuitry being configured to cause the network apparatus to:
perform time-domain beamformed communication with terminal devices served by the network apparatus using the antenna panel split into N>1 subpanels, each subpanel having two input ports and being fed, via the input ports, by signals and configured to generate beams by application of antenna element weights to its antenna elements,
wherein the subpanels are at least phase-wise synchronized with each other, wherein when one and the same signal is fed into the input ports of all the subpanels, signals as transmitted from the subpanels add up coherently to represent a 1-layer transmission by a time reference being shared between the subpanels,
wherein the time-domain beamformed communication is performed by the network apparatus using from 1 to 2N layers per symbol of a transmission time interval according to a mapping between the input ports and the signals as transmitted from the subpanels, and
wherein the network apparatus further is configured to provide one and the same antenna port of a one-port CSI-RS port to all input ports, wherein the one-port CSI-RS is transmitted in a first set of beams.

11. The network apparatus according to claim 10, wherein the antenna element weights are reused between the subpanels, whereby all subpanels are, according to the antenna element weights, identically weighted.

12. The network apparatus according to claim 10, wherein the network apparatus further is configured to:
receive, from one of the terminal devices served by the network apparatus, a first feedback, the first feedback at least identifying which beam in the first set of beams was received with highest power by the terminal device.

13. The network apparatus according to claim 12, wherein the network apparatus further is configured to:
provide one unique antenna port of a 2N-port CSI-RS to each of the input ports, wherein the 2N-port CSI-RSs are transmitted in a second set of beams selected according to the first feedback.

14. The network apparatus according to claim 13, wherein performing time-domain beamformed communication comprises:
receive, from said one of the terminal devices, second feedback, the second feedback comprising channel information relating to the second set of beams, the channel information at least indicating how many transmission layers to be used for communication with said one of the terminal devices.

15. The network apparatus according to claim 14, wherein the network apparatus further is configured to:
provide an M-port CSI-RS, where M≤N, where each antenna port is associated with N subpanels, wherein one input port only from each subpanel is assigned to the antenna port, and wherein the M-port CSI-RS is transmitted in a third set of beams selected according to the first or second feedback.

16. The network apparatus according to claim 15, wherein the network apparatus further is configured to:
receive, from said one of the terminal devices, third feedback, the third feedback comprising channel information relating to the third set of beams, the channel information at least indicating how many transmission layers to be used for communication with said one of the terminal devices.

17. The network apparatus according to claim 14, wherein the network apparatus further is configured to:
perform time-domain beamformed communication with said one of the terminal devices according to the channel information, whereby the beamformed communication is performed using as many transmission layers as indicated by the channel information.

18. A computer program product for controlling transmission from an antenna panel, the computer program product comprising a non-transitory computer readable medium storing computer code which, when run on processing circuitry of a network apparatus, causes the network apparatus to:
perform time-domain beamformed communication with terminal devices served by the network apparatus using the antenna panel split into N>1 subpanels, each subpanel having two input ports and being fed, via the input ports, by signals and configured to generate beams by application of antenna element weights to its antenna elements,
wherein the subpanels are at least phase-wise synchronized with each other, wherein when one and the same signal is fed into the input ports of all the subpanels, signals as transmitted from the subpanels add up coherently to represent a 1-layer transmission by a time reference being shared between the subpanels,
wherein the time-domain beamformed communication is performed by the network apparatus using from 1 to 2N layers per symbol of a transmission time interval according to a mapping between the input ports and the signals as transmitted from the subpanels, and
wherein the computer code further causes the network apparatus to provide one and the same antenna port of a one-port CSI-RS port to all input ports, wherein the one-port CSI-RS is transmitted in a first set of beams.

* * * * *